United States Patent [19]

Baiker et al.

[11] Patent Number: 4,789,533

[45] Date of Patent: Dec. 6, 1988

[54] CATALYST FOR REDUCTIVE CONVERSION OF NITROGEN OXIDES IN WASTE GASES

[75] Inventors: Alfons Baiker, Opfikon; Peter Dollenmeier, Wallisellen, both of Switzerland; Marek Glinski, Warsaw, Poland

[73] Assignee: Lonza Ltd., Gampel, Switzerland

[21] Appl. No.: 56,909

[22] Filed: Jun. 3, 1987

Related U.S. Application Data

[62] Division of Ser. No. 27,395, Mar. 18, 1987, Pat. No. 4,742,037.

[30] Foreign Application Priority Data

Apr. 17, 1986 [CH] Switzerland .................. 1556/86

[51] Int. Cl.$^4$ .................. B01J 8/00; C01B 17/00
[52] U.S. Cl. .................. 423/239
[58] Field of Search .................. 423/239, 239 A; 502/247

[56] References Cited

U.S. PATENT DOCUMENTS

| 4,048,122 | 9/1977 | Matsushita et al. | 252/461 |
| 4,188,365 | 2/1980 | Yoshioka et al. | 423/239 |

FOREIGN PATENT DOCUMENTS

| 2458888 | 5/1979 | Fed. Rep. of Germany . |
| 52-48564 | 4/1977 | Japan . |

Primary Examiner—Gregory A. Heller
Attorney, Agent, or Firm—Fisher, Christen & Sabol

[57] ABSTRACT

Catalyst for the reductive conversion of nitrogen oxides, optionally accompanied by sulfur dioxides, in waste gases, produced by the impregnation of a support, for example, a $TiO_2$ support, with a vanadium alkoxide, and treatment of the impregnated support in the oxygen-containing gas current. The catalyst brings about a conversion of the nitrogen oxides even at a relatively low temperature of 150° to 350° C.

15 Claims, 2 Drawing Sheets

CATALYST FOR REDUCTIVE CONVERSION OF NITROGEN OXIDES IN WASTE GASES

This is a divisional application of Ser. No. 027,395, filed on Mar. 18, 1987, now U.S. Pat. No. 4,742,037.

BACKGROUND OF THE INVENTION

The invention relates to catalysts used for the reductive conversion of nitrogen oxides in waste gases.

Processes are known for the reductive conversion of nitrogen oxides in waste gases by a catalyst in the presence of ammonia. These catalysts are an intimate mixture of components of titanium in the form of oxides, a metal oxide, for example, vanadium oxide, optionally with the addition of tin oxide and, for example, silicon oxide (see German AS No. 2,458,888). Such catalysts were developed to be able to treat waste gases containing nitrogen oxide (gases which can also contain sulfur oxides) with retention of a high activity for a long period.

A strong oxidation activity toward ammonia, which at elevated temperatures leads to the formation of nitrogen oxides from ammonia, is also known as being disadvantageous in catalysts which are applied to an inert support. Thus, the removal effectiveness thereof for nitrogen oxides necessarily decreases.

BROAD DESCRIPTION OF THE INVENTION

The main object of the invention is to make available catalysts which, on the one hand, are present in the form of supported catalysts, in which the active ingredients are only on the surface of the support, and, on the other hand, are equal to known catalysts in regard to reaction temperatures and stability toward sulfur oxide. Other objects and advantages of the invention are set out herein or are obvious herefrom to one skilled in the art.

The objects and advantages are achieved by the catalyst and process of the invention.

The invention catalysts are produced by the process where the support, containing $TiO_2$, $SiO_2$, $ZrO$, $Cr_2O_3$ and/or $SnO_2$, is impregnated at least once with a vanadium alkoxide dissolved in an apolar, water-free solvent, preferably n-hexane or petroleum ether, and the impregnated support is calcined at temperatures of 300° to 600° C. in the dry gas current with 15 to 25 percent by volume of oxygen, preferably in the air current, to achieve a surface deposit of the active parts in the form of vanadium oxides on the support. The catalyst is subsequently activated.

To prepare the support, a commercial material can be suspended in a carrier liquid, optionally with the addition of a volatile binder. After removal of the carrier liquid by volatilization or evaporation, the residue can be crushed or ground and the desired fraction screened out. Further, suitable granular fractions can be produced using granulation processes known in the art, such as, processing with pan granulators. Granular fractions in spherical shape, for example, produced according to known spray drying processes, can also be used. The prepared support is suitably calcined by heat treatment from 200° to 600° C.

A further suitable form of the support is produced according to the sol-gel process.

The preferred gels include $SiO_2/TiO_2$ gels. For their production an alkyl silicate, e.g., tetraethyl silicate, is hydrolyzed in water and the ethanol formed is removed under reduced pressure. In this way, a colorless, completely transparent silica sol is obtained.

The titanium dioxide sol is also obtained by dissolving an alkyl titanate with the general formula Ti-(O—$C_XH_{2X+1}$)Y, in which X is a number from 2 to 5 and Y is the number 4, for example, tetraisopropyl titanate, in water or in the corresponding alcohol by instilling the solution into an approximately 1N hydrochloric acid solution and by subsequently evaporating the resulting alcohol and the HCl under reduced pressure. These sol solutions are diluted with water and stirred together in the ratio of 20 to 60 mole percent of $SiO_2$ to 80 to 40 mole percent of $TiO_2$. The mixed sol is dried, whereby the mixed gel is formed, and put into the desired granular fraction by crushing and fractionating.

The described supports can be used as such, but also the supports, for their part, can be applied onto a supporting frame. Examples of such supporting frames are extruded ceramic bodies, so-called honeycomb bodies, ceramic foam materials produced by impregnating with ceramic slip, drying and firing of organic, open-cell, flexible foams, whereby during the firing the organic material disappears and a likeness thereof remains in ceramic form, or, for example, sintered bodies of ceramic material broken into lumps or spherically shaped.

The active parts of the catalyst according to the invention are vanadium oxides. One can start with finely ground $V_2O_5$ which in an alcohol of the general formula $C_xH_{2x+1}OH$, in which x is 1 to 8, for example, isobutanol, is converted to vanadium alkoxide and is distilled from the reaction mixture The support, for its part, is impregnated with the vanadium alkoxide. For this purpose the vanadium alkoxide can be dissolved in an apolar, water-free solvent, and the support, optionally drenched with the same solvent, is sprayed on. In a further embodiment the support can also be immersed in a vanadium alkoxide solution, whereby the solvents are applied. The impregnation process must be performed in an inert atmosphere, for example, in the dry $N_2$ current.

Finally, the impregnated support is calcined at a temperature of 300° to 600° C. for 3 to 6 hours in a gas current, containing 15 to 25 percent by volume of oxygen, suitably containing 21 percent by volume of oxygen, preferably in the dry air current.

The impregnating and calcining process must be performed in an absolutely water-free environment. Both the solvent, the protective atmosphere and also the gas current for the calcining are to be completely water-free.

The impregnating and calcining steps are performed at least once, suitably one to six times and preferably three to five times in succession.

The catalysts according to the invention are suitable for converting nitrogen oxides to harmless gases, e.g., nitrogen, from gases, for example, flue gases and waste gases, which contain oxygen, nitrogen, water vapor, carbon monoxide, carbon dioxide, nitrogen oxides and optionally sulfur dioxide.

The nitrogen oxides to be converted include NO, $N_2O_3$, $NO_2$, $N_2O_4$ and $N_2O_5$.

The presence of oxygen promotes the reduction of nitrogen oxide (NO) in the presence of ammonia as the reducing agent For nitrogen oxides of higher valences than NO the presence of oxygen is not absolutely necessary.

The amount of ammonia necessary for treating the gas mixture is determined by the content of nitrogen oxides. Usually 1 to 3 mole, preferably 1 mole, of ammonia is used per mole of nitrogen oxide.

The catalyst can be laid out as a fixed bed catalyst and makes possible a space velocity of 300 to 100,000 h$^{-1}$, preferably 7,000 to 50,000 h$^{-1}$, starting from normal temperature and pressure (NTP).

The reaction temperature as a rule is 150° to 350° C., in the presence of SO$_2$ preferably 300° to 350° C., otherwise 150° to 250° C.

The pressure conditions are not critical; a range from normal pressure to 10 bars can be regarded as a suitable operating range.

DETAILED DESCRIPTION OF THE INVENTION

Example 1

Figure 1:
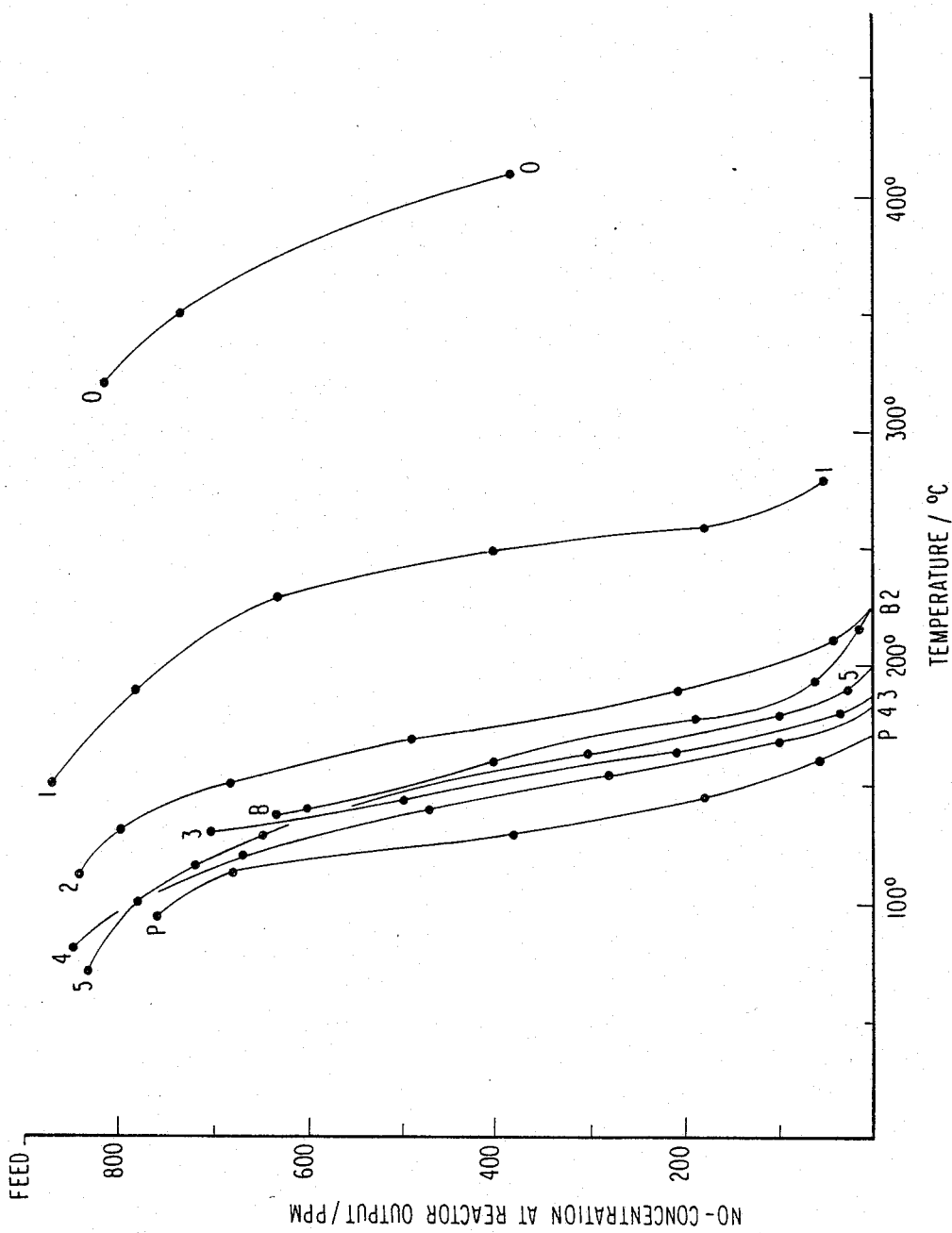
FIG. 1 is graph of the catalyst tests of Example 1.

Supports (a) Production Of A TiO$_2$ Support 20 g of TiO$_2$ (P25 Degussa) was stirred with 35 ml of water. The paste was dried in a beaker for 24 hours at 60° C., and then at 120° C. for another 72 hours. The residue was crushed and the screening fraction of 0.5 to 1.0 m was calcined for 1 hour at 600° C. in the air, and afterward for 5 hours in dry nitrogen, also at 600° C.

(b) Production Of A Mixed SiO$_2$/TiO$_2$ Gel

Silica sol:

208 g of Si(OC$_2$H$_5$)$_4$ (Fluka, pure 98 percent) was distilled at 168° C. under normal pressure. 500 ml of water was added thereto and vigorously stirred for 48 hours at 50° C. Ethanol was removed on a rotary evaporator under reduced pressure at 50° C. In this way a colorless, fully transparent silica sol was obtained. Titanium dioxide sol:

239 g of distilled Ti(O—i—C$_3$H$_7$)$_4$ (Fluka, pract.) (bp 109°-110° C./12 torrs) wa dissolved in 200 ml of i-propanol (Fluka, very pure) and the resultant solution was distilled into a 1N hydrochloric acid solution (1.5 L) during 4 hours. Isopropanol and partially also HCl were removed in a rotary evaporator at 50° C. under reduced pressure. A colorless, transparent titanium dioxide sol was obtained. Mixed gel:

The sol solutions were diluted with water in a measuring flask to 1 liter. Equivalent amounts of these solutions were stirred together for 30 min. The resultant mixed sol was dried for 24 hours at 60° C., then 72 hours at 120° C. The mixed gel was crushed and screened, and the fraction 0.5 to 1 mm was prepared for the impregnation described below.

Active Part 15 g of finely ground V$_2$O$_5$ was refluxed (104°-105° C.) for 2 hours in isobutanol with vigorous stirring. The reaction mixture was filtered and the i-butanol was distilled off. Then it was further distilled under vacuum, whereby the vanadium i-butoxide was converted at about 110° C.

Impregnation

The supports according to (a) and (b) were in each case transferred under dry nitrogen into a 100-ml round-bottom flask with side neck and stopcock. They were drenched with 10 ml of dry n-heptane, and the vanadium i-butoxide was added thereto. The flask was closed for 24 hours, then the supernatant solution was poured off and the residue was washed with n-heptane until no vanadium compounds could any longer be detected in the washing solution. All operations were performed in the dry N$_2$ current. Finally, calcining was performed at 300° C. for 3 hours in the dry air current.

The impregnating and calcining step was performed on 6 supports of type (a) between 0 and 5 times and on a support of type (b) one time.

Activity Tests

The catalysts obtained according to the invention were examined under the following test conditions:

| Amount of catalyst | 1 g |
|---|---|
| Gas throughput | 124.7 Ml$_n$/min |
| Input concentration | |
| Oxygen | 1.83 percent |
| Nitrogen monoxide | 900 ppm |
| Ammonia | 900 ppm |
| Sulfur dioxide | 0 or 390 ppm. |

The poisoning tests were performed at 350° C. for 16 hours and the catalysts showed no loss of activity.

The results are recorded in FIG. 1, in which:

(i) curve 0 represents TiO$_2$ support according to (a) unimpregnated
(ii) curve 1 represents TiO$_2$ support according to (a) impregnated once
(iii) curve 2 represents TiO$_2$ support according to (a) impregnated twice
(iv) curve 3 represents TiO$_2$ support according to (a) impregnated three times
(v) curve 4 represents TiO$_2$ support according to (a) impregnated four times
(vi) curve 5 represents TiO$_2$ support according to (a) impregnated five times
(vii) curve B support according to (b), mixed gel 50 mole percent of TiO$_2$/SiO$_2$ with one time impregnation
(viii) curve P comparison example, catalyst produced according to German AS No. 2,458,888, column 39/40, Example IV-1, the NO concentration at the reactor output in ppm in relation to the reaction temperature in °C.

Example 2

Cr$_2$O$_3$ Support 250 g of chromium nitrate {Cr(NO$_3$)$_3$.9 H$_2$O} was dissolved in 2.3 liters of distilled water. 15 percent NH$_3$ solution was slowly instilled during 3 hours until the pH was about 10. The resultant light green precipitate was stirred for two more hours. Then the precipitate was allowed to settle at least until it occupied about half the volume of the liquid, whereupon the supernatant solution was decanted. Then refilling to the brim was performed and decanting to the neutral point was repeated.

The washed residue was dried by vacuum, and then dried for 24 hours at 60° C. and 48 hours at 120° C. A screening fraction of 0.5 to 1.0 mm was obtained by careful crushing. This fraction was calcined for 1 hour at 600° C. under air flow and 5 hours under nitrogen.

Impregnation

The support (5 to 6 g) was transferred under dry nitrogen into a 100-ml round-bottom flask with side neck and stopcock. The support was drenched with 10 ml of heptane (with no more than 3 to 4 ppm of $H_2O$) and 0.4 ml of vanadium i-butoxide was added thereto. The flask was closed for 24 hours and then the supernatant solution was poured off under $N_2$ flow. The residue was washed with heptane until no vanadium compound could any longer be detected in the washing solution (under $N_2$ current). The catalyst was calcined under dry air current at 300° C. for 3 hours.

Figure 2:
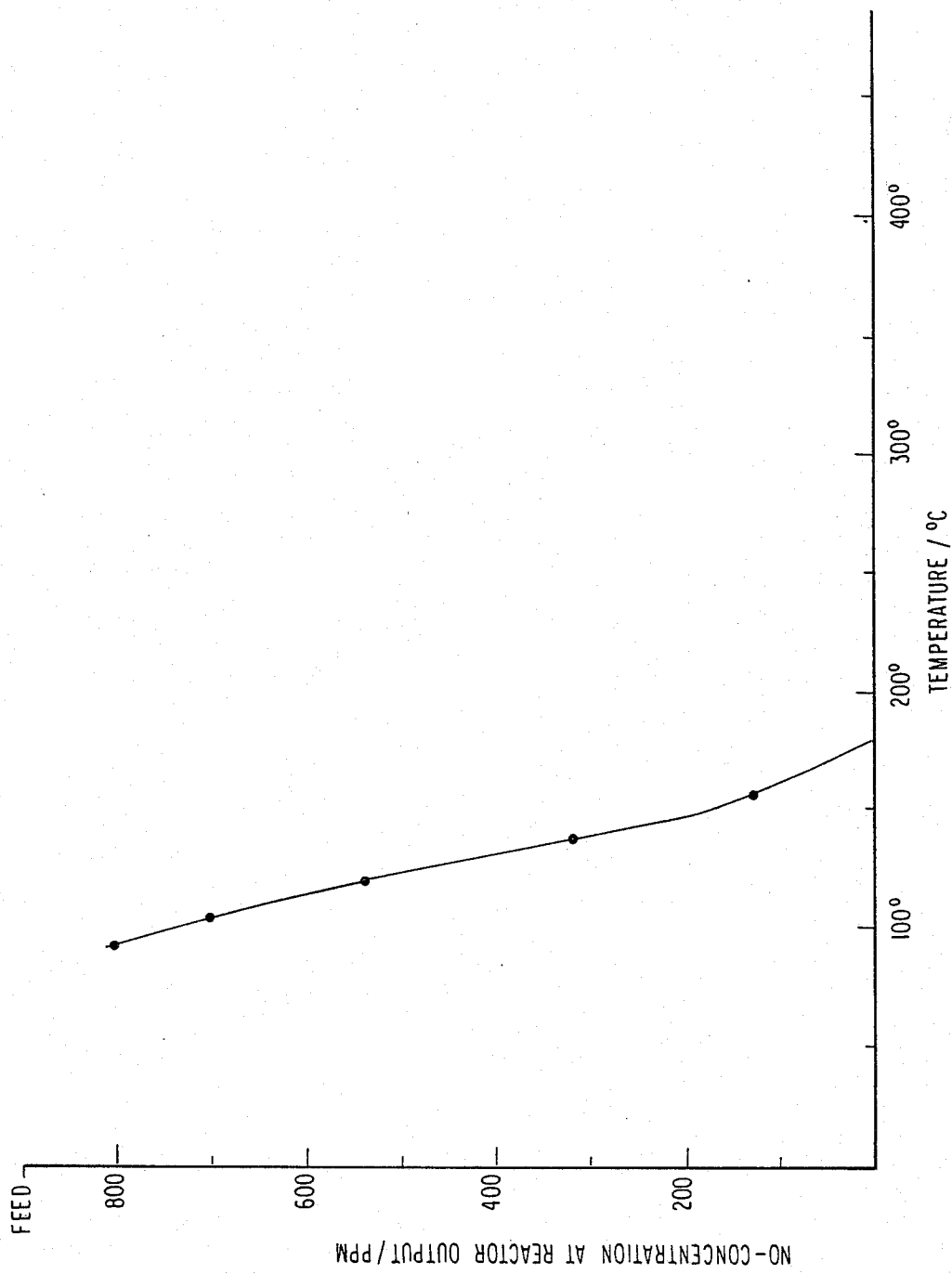
FIG. 2 is graph of the catalyst tests of Example 2.

The measured values are illustrated in FIG. 2, in which the curve represents the NO concentration at the reactor output in ppm in relation to the reaction temperature in °C.

What is claimed is:

1. Process comprising reductively converting nitrogen oxides in a gas mixture in the presence of ammonia and oxygen by bringing the gas mixture into contact with a catalyst at 150° to 350° C. with a space velocity of 7,000 to 50,000 $h^{-1}$, said catalyst being produced by the process comprising conducting, at least once, the sequence of impregnating a support, containing $TiO_2$, $SiO_2$, $ZrO$, $Cr_2O_3$ and/or $SnO_2$, with a vanadium alkoxide dissolved in an apolar, water-free solvent in an inert atmosphere, and calcining the impregnated support at a temperature of 300° to 600° C. for 3 to 6 hours in the dry gas current with 15 to 25 percent by volume of oxygen to achieve a surface deposit of the active parts in the form of vanadium oxide on the support, said impregnating step and said calcining step being performed in absolutely water-free conditions and environment.

2. The process as claimed in claim 1 wherein 1 to 3 moles of ammonia is used per mole of nitrogen oxide.

3. The process as claimed in claim 1 wherein the catalyst is used in a fixed bed.

4. The process as claimed in claim 1 wherein the nitrogen oxides include NO, $N_2O_3$, $NO_2$, $N_1O_4$ and/or $N_2O_5$.

5. The process as claimed in claim 1 wherein, when $SO_2$ is present, the reductive conversion is conducted at a temperature of 300° to 350° C.

6. The process as claimed in claim 2 wherein, when $SO_2$ is not present, the reductive conversion is conducted at a temperature of 150° to 250° C.

7. The process as claimed in claim 1 wherein the reductive conversion is started at a pressure between normal pressure and 10 bars.

8. The process as claimed in claim 1 wherein, in the catalyst preparation process, n-hexane or petroleum ether is the apolar, water-free solvent.

9. The process as claimed in claim 1 wherein, in the catalyst preparation process, the impregnated support is treated in a gas current with about 21 percent by volume of oxygen.

10. The process as claimed in claim 1 wherein, in the catalyst preparation process, the gas current is an air current.

11. The process as claimed in claim 1 wherein, in the catalyst preparation process, the support consists of a mixed gel, produced from 20 to 60 mole percent of silica sol and 80 to 40 mole percent of titanium dioxide sol.

12. The process as claimed in claim 1 wherein, in the catalyst preparation process, the support is impregnated with vanadium i-butoxide and the vanadium oxide after activation exhibits a valence of $-5$ and is present in the form of $V_2O_5$.

13. The process as claimed in claim 1 wherein the sequence of the impregnation step and the calcining step is performed between one and six times.

14. The process as claimed in claim 1 wherein the sequence of the impregnation step and the calcining step is performed between three and five times.

15. The process as claimed in claim 1 wherein the sequence of the impregnation step and the calcining step is performed two, three, four, five or six times.

* * * * *